United States Patent
Itoh et al.

(10) Patent No.: US 12,503,626 B2
(45) Date of Patent: *Dec. 23, 2025

(54) ORGANOPOLYSILOXANE COMPOSITION FOR FORMING PRESSURE SENSITIVE ADHESIVE LAYER AND USE OF SAME

(71) Applicant: DOW TORAY CO., LTD., Tokyo (JP)

(72) Inventors: Maki Itoh, Ichihara (JP); Akihiro Nakamura, Ichihara (JP); Michitaka Suto, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 988 days.

This patent is subject to a terminal disclaimer.

(21) Appl. No.: 17/634,932

(22) PCT Filed: Aug. 11, 2020

(86) PCT No.: PCT/JP2020/030623
§ 371 (c)(1),
(2) Date: Feb. 11, 2022

(87) PCT Pub. No.: WO2021/029412
PCT Pub. Date: Feb. 18, 2021

(65) Prior Publication Data
US 2022/0275251 A1    Sep. 1, 2022

(30) Foreign Application Priority Data

Aug. 13, 2019 (JP) ................ 2019-148345

(51) Int. Cl.
*C09J 7/38* (2018.01)
*C09J 183/04* (2006.01)

(52) U.S. Cl.
CPC .............. *C09J 7/38* (2018.01); *C09J 183/04* (2013.01); *C09J 2483/00* (2013.01)

(58) Field of Classification Search
CPC ........ C09J 7/38; C09J 183/04; C09J 2483/00; C09J 2301/162; C09J 2301/312; C09J 2203/326; C08G 77/08; C08G 77/12; C08G 77/16; C08G 77/20; C08G 77/80
See application file for complete search history.

(56) References Cited

U.S. PATENT DOCUMENTS

| | | |
|---|---|---|
| 3,983,298 A | 9/1976 | Hahn et al. |
| 4,051,454 A | 9/1977 | Leiser et al. |
| 4,082,726 A | 4/1978 | Mine et al. |
| 4,087,585 A | 5/1978 | Schulz |
| 5,248,739 A | 9/1993 | Schmidt et al. |
| 5,290,885 A | 3/1994 | Vincent et al. |
| 5,366,809 A | 11/1994 | Schmidt et al. |
| 6,121,368 A | 9/2000 | Heying et al. |
| 8,044,153 B2 | 10/2011 | Yamamoto et al. |
| 8,206,779 B2 | 6/2012 | Suzuki et al. |
| 10,125,242 B2 | 11/2018 | Iimura et al. |
| 10,618,255 B2 | 4/2020 | Choi et al. |
| 2004/0097639 A1 | 5/2004 | Gordon et al. |
| 2006/0172140 A1 | 8/2006 | Kuroda et al. |
| 2007/0047754 A1 | 3/2007 | Kishi |
| 2007/0059535 A1 | 3/2007 | Nakamura |
| 2007/0134425 A1 | 6/2007 | Morita et al. |
| 2009/0118441 A1 | 5/2009 | Yamamoto et al. |
| 2010/0323145 A1 | 12/2010 | Aoki |
| 2011/0097579 A1 | 4/2011 | Mizuno et al. |
| 2012/0040180 A1 | 2/2012 | Husemann et al. |
| 2012/0113361 A1 | 5/2012 | Huang et al. |
| 2012/0175045 A1 | 7/2012 | Furuya et al. |
| 2012/0231245 A1 | 9/2012 | Kim et al. |
| 2013/0069890 A1 | 3/2013 | Lee et al. |
| 2013/0101840 A1 | 4/2013 | Yang et al. |
| 2013/0101841 A1 | 4/2013 | Yang et al. |
| 2013/0186564 A1 | 7/2013 | Keller et al. |
| 2015/0183951 A1 | 7/2015 | Bhagwagar et al. |

(Continued)

FOREIGN PATENT DOCUMENTS

| | | |
|---|---|---|
| CN | 1714117 A | 12/2005 |
| CN | 104387778 A | 3/2015 |

(Continued)

OTHER PUBLICATIONS

International Search Report (with translation) for PCT/JP2020/030623 dated Oct. 27, 2020, 4 pages.
Machine assisted English translation of JP2006225420 obtained from https://patents.google.com/patent on Apr. 21, 2022, 10 pages.
Machine assisted English translation of JP5553395 obtained from https://patents.google.com/patent on Apr. 22, 2022, 12 pages.
Machine assisted English translation of WO2018048245 obtained from https://patents.google.com/patent on Apr. 22, 2022, 12 pages.
Machine assisted English translation of WO2018048240 obtained from https://patents.google.com/patent on Apr. 22, 2022, 12 pages.
Machine assisted English translation of KR20180012966 obtained from https://patents.google.com/patent on Apr. 22, 2022, 10 pages.

(Continued)

*Primary Examiner* — Scott R. Walshon
(74) *Attorney, Agent, or Firm* — Warner Norcross + Judd LLP

(57) ABSTRACT

Provided is a curing reactive organopolysiloxane composition that forms a pressure-sensitive adhesive layer having practically sufficient curability and pressure-sensitive adhesive strength, and a relatively high shear storage elastic modulus and tensile stress at 500% strain. The organopolysiloxane composition comprises: (A) a chain organopolysiloxane having a content of vinyl portions in alkenyl groups within a range of 0.02 to 0.30 mass %; (B) an organopolysiloxane resin having a content of hydroxyl groups and the like of 9 mol % or less, and a molecular weight of 4500 or more; (C) an organohydrogenpolysiloxane; and (D) a hydrosilylation reaction catalyst. A mass ratio of a resin component to a chain siloxane component is within a range of 1.4 to 3.0. A pressure-sensitive adhesive layer obtained by curing the organopolysiloxane composition has a shear storage elastic modulus G' at 25° C. of 1.0 MPa or more and a stress at 500% strain of 0.50 MPa or more.

14 Claims, No Drawings

(56) References Cited

U.S. PATENT DOCUMENTS

| | | |
|---|---|---|
| 2015/0337188 A1 | 11/2015 | Sakakibara et al. |
| 2015/0376488 A1 | 12/2015 | Tan et al. |
| 2017/0152350 A1 | 6/2017 | Heikkinen et al. |
| 2017/0190878 A1 | 7/2017 | Timura et al. |
| 2017/0217143 A1 | 8/2017 | Kim et al. |
| 2017/0342677 A1 | 11/2017 | Uno et al. |
| 2018/0065347 A1 | 3/2018 | Fukui et al. |
| 2018/0208799 A1 | 7/2018 | Liu et al. |
| 2018/0258332 A1 | 9/2018 | Song et al. |
| 2018/0362810 A1 | 12/2018 | Bogner et al. |
| 2019/0134946 A1 | 5/2019 | Choi et al. |
| 2019/0292320 A1 | 9/2019 | Watanabe et al. |
| 2020/0131408 A1 | 4/2020 | Otake et al. |
| 2020/0224069 A1 | 7/2020 | Itoh et al. |
| 2020/0354615 A1 | 11/2020 | Itoh et al. |
| 2020/0392383 A1 | 12/2020 | Hino et al. |
| 2021/0246342 A1 | 8/2021 | Jang et al. |
| 2021/0269691 A1 | 9/2021 | Itoh et al. |
| 2021/0284888 A1 | 9/2021 | Itoh et al. |
| 2021/0292607 A1 | 9/2021 | Itoh et al. |
| 2021/0317353 A1 | 10/2021 | Kuroda |
| 2022/0275251 A1 | 9/2022 | Itoh et al. |
| 2022/0275262 A1 | 9/2022 | Itoh et al. |
| 2022/0282142 A1 | 9/2022 | Degroot, Jr. et al. |
| 2022/0372345 A1 | 11/2022 | Tse et al. |
| 2023/0144102 A1 | 5/2023 | Ihara et al. |
| 2023/0174721 A1 | 6/2023 | Liu et al. |
| 2023/0193093 A1 | 6/2023 | Cao et al. |
| 2023/0265324 A1 | 8/2023 | Kelley et al. |
| 2024/0009343 A1 | 1/2024 | Yu et al. |
| 2024/0043623 A1 | 2/2024 | Yamazaki et al. |
| 2024/0059932 A1 | 2/2024 | Onodera et al. |
| 2024/0270965 A1 | 8/2024 | Cao et al. |
| 2024/0294814 A1 | 9/2024 | Cao et al. |

FOREIGN PATENT DOCUMENTS

| | | |
|---|---|---|
| CN | 106118584 A | 11/2016 |
| CN | 107250313 A | 10/2017 |
| EP | 0537784 A1 | 4/1993 |
| EP | 0581539 A2 | 2/1994 |
| EP | 2322584 A1 | 5/2011 |
| EP | 2570899 A2 | 3/2013 |
| EP | 2627714 A1 | 8/2013 |
| EP | 2788448 A1 | 10/2014 |
| EP | 2865719 A1 | 4/2015 |
| JP | S62181357 A | 8/1987 |
| JP | H05214316 A | 8/1993 |
| JP | H06228526 A | 8/1994 |
| JP | H07197008 A | 8/1995 |
| JP | H08209104 A | 8/1996 |
| JP | 2000044921 A | 2/2000 |
| JP | 2001081436 A | 3/2001 |
| JP | 2002322363 A | 11/2002 |
| JP | 2006213810 A | 8/2006 |
| JP | 2006225420 A | 8/2006 |
| JP | 2007009189 A | 1/2007 |
| JP | 2007131694 A | 5/2007 |
| JP | 2009051916 A | 3/2009 |
| JP | 2010108038 A | 5/2010 |
| JP | 2010248413 A | 11/2010 |
| JP | 2013065009 A | 4/2013 |
| JP | 2013512326 A | 4/2013 |
| JP | 2013233852 A | 11/2013 |
| JP | 2014063064 A | 4/2014 |
| JP | 6553395 B2 | 7/2014 |
| JP | 2014182335 A | 9/2014 |
| JP | 2014522436 A | 9/2014 |
| JP | 5753103 B2 | 7/2015 |
| JP | 2017047767 A | 3/2017 |
| JP | 6417310 B2 | 11/2018 |
| JP | 2019031610 A | 2/2019 |
| KR | 20160083583 A | 7/2016 |
| KR | 20180012966 A | 2/2018 |
| TW | 201704348 A | 2/2017 |
| WO | 2004046225 A1 | 6/2004 |
| WO | 2012166870 A1 | 12/2012 |
| WO | 2015151221 A1 | 10/2015 |
| WO | 2016139955 A1 | 9/2016 |
| WO | 2017038913 A1 | 3/2017 |
| WO | 2017038920 A1 | 3/2017 |
| WO | 2017048890 A1 | 3/2017 |
| WO | 2017082654 A1 | 5/2017 |
| WO | 2017188308 A1 | 11/2017 |
| WO | 2018048240 A1 | 3/2018 |
| WO | 2018048245 A1 | 3/2018 |
| WO | 2018149717 A1 | 8/2018 |
| WO | 2018186161 A1 | 10/2018 |
| WO | 2018193973 A1 | 10/2018 |
| WO | 2019009175 A1 | 1/2019 |
| WO | 2020032285 A1 | 2/2020 |
| WO | 2020032286 A1 | 2/2020 |
| WO | 2020032287 A1 | 2/2020 |
| WO | 2021081863 A1 | 5/2021 |

OTHER PUBLICATIONS

Machine assisted English translation of WO2017038920 obtained from https://patents.google.com/patent on Apr. 22, 2022, 14 pages.
Machine assisted English translation of WO2017038913 obtained from https://patents.google.com/patent on Apr. 22, 2022, 14 pages.
Machine assisted English translation of WO2015151221 obtained from https://patents.google.com/patent on Apr. 22, 2022, 12 pages.
Machine assisted English translation of JP6417310 obtained from https://patents.google.com/patent on Apr. 22, 2022, 8 pages.
Machine assisted English translation of JP2019031610 obtained from https://patents.google.com/patent on Apr. 22, 2022, 8 pages.
Machine assisted English translation of KR20160083583 obtained from https://patents.google.com/patent on Apr. 22, 2022, 12 pages.
Machine assisted English translation of JP2017047767 obtained from https://patents.google.com/patent on Apr. 22, 2022, 9 pages.
Machine assisted English translation of JP2014063064 obtained from https://patents.google.com/patent on Apr. 22, 2022, 9 pages.
Machine assisted English translation of JP2013233852 obtained from https://patents.google.com/patent on Apr. 22, 2022, 9 pages.
Machine assisted English translation of JP2002322363 obtained from https://patents.google.com/patent on Apr. 22, 2022, 15 pages.
International Search Report (with translation) for PCT/JP2020/030624 dated Oct. 27, 2020, 4 pages.
International Search Report (with translation) for PCT/JP2020/030625 dated Oct. 27, 2020, 4 pages.
Machine assisted English translation of CN104387778A obtained from https://patents.google.com/patent on Nov. 3, 2022, 8 pages.
Machine assisted English translation of CN106118584A obtained from https://patents.google.com/patent on Nov. 3, 2022, 12 pages.
Machine assisted English translation of JP2000044921A obtained from https://patents.google.com/patent on Nov. 3, 2022, 8 pages.
Machine assisted English translation of JP2007009189A obtained from https://patents.google.com/patent on Nov. 3, 2022, 8 pages.
Machine assisted English translation of JP2010108038A obtained from https://patents.google.com/patent on Nov. 3, 2022, 10 pages.
Machine assisted English translation of JP2010248413A obtained from https://patents.google.com/patent on Nov. 3, 2022, 8 pages.
English translation of International Search Report for PCT/JP2018/010769 dated Jun. 12, 2018, 2 pages.
Machine assisted English translation of JPS62181357A obtained from https://worldwide.espacenet.com/patent on Nov. 3, 2022, 4 pages.
Machine assisted English translation of CN107250313A obtained from https://patents.google.com/patent on Nov. 3, 2022, 9 pages.
English Translation of International Search Report for PCT/JP2019/031809, dated Oct. 15, 2019, 2 pages.
Machine assisted English translation of JPH08209104A obtained from https://patents.google.com/patent on Nov. 3, 2022, 6 pages.
Machine assisted English translation of WO2016139955A1 obtained from https://patents.google.com/patent on Oct. 20, 2023, 9 pages.
Machine assisted English translation of WO2018149717A1 obtained from https://patents.google.com/patent on Oct. 20, 2023, 10 pages.

ORGANOPOLYSILOXANE COMPOSITION FOR FORMING PRESSURE SENSITIVE ADHESIVE LAYER AND USE OF SAME

CROSS-REFERENCE TO RELATED APPLICATIONS

This application is the U.S. National Stage of International Application No. PCT/JP2020/030623 filed on 11 Aug. 2020, which claims priority to and all advantages of Japanese Application No. 2019-148345 filed on 13 Aug. 2019, the content of which is incorporated herein by reference.

TECHNICAL FIELD

The present invention relates to a curing reactive organopolysiloxane composition that forms a pressure-sensitive adhesive layer and an application thereof.

BACKGROUND ART

Polysiloxane-based pressure-sensitive adhesive compositions are superior to acrylic-based and rubber-based pressure-sensitive adhesive compositions in electrical insulation, heat resistance, cold resistance, pressure-sensitive adhesion to various adherends, and transparency if necessary, and therefore, the addition reaction curing type pressure-sensitive adhesive compositions in particular are widely used. Furthermore, in recent years, applications to advanced electronics materials such as smart devices and the like, display element fields, speakers, and the like are being considered, and polysiloxane-based pressure-sensitive adhesives with excellent heat and cold resistance are expected to effectively function to protect electrode layers and display layers and improve adhesion between layers.

In particular, in recent material development, there is a need for a polysiloxane-based pressure-sensitive adhesive composition with a high degree of freedom in the design of the storage elastic modulus (for example, shear storage elastic modulus G'), excellent curability, and sufficient pressure-sensitive adhesive strength for practical use, in a wide temperature range including low temperatures such as −20° C. and the like. Furthermore, in recent material development, a pressure-sensitive adhesive composition having excellent tensile stress as well as the shear storage elastic modulus G' are required. The pressure-sensitive adhesive compositions described in the known literature and the like do not sufficiently satisfy these properties, and there is still room for improvement.

For example, while Patent Document 1 discloses a pressure-sensitive adhesive rubber sheet, there is no description or suggestion of using a resin component having a lower resin component amount in the ratio of the resin component and siloxane polymer component and particularly having specific properties such as high molecular weight, a content of hydroxyl groups, and the like. Furthermore, the pressure-sensitive adhesive rubber sheet uses finely powdered silica and the like and does not satisfy the storage elastic modulus (G') and tensile stress, which are objects of the present invention.

Similarly, while Patent Document 2 discloses a silicone pressure-sensitive adhesive which uses an organopolysiloxane resin having a number average molecular weight of 950 to 1600, there is no description or suggestion of using a combination of resin components having specific properties such as high molecular weight, a content of hydroxyl groups, and the like. Furthermore, while the silicone pressure-sensitive adhesive has a certain pressure-sensitive adhesive force, the storage elastic modulus (G') and tensile stress, which are objects of the present invention, are not satisfied.

In contrast, Patent Document 3 proposes a laminated body provided with a transparent resin adhesive layer, wherein the substance amount ratio of the resin component to the polymer component is within a range of 0.5 to 1.0 and the difference in the storage elastic modulus G' at low temperatures and room temperature is small. Unfortunately, only a condensation reactive transparent resin adhesive layer is specifically disclosed, making the curing reaction problematically too slow for industrial use. Furthermore, the transparent resin adhesive layer does not satisfy the storage elastic modulus (G') and sufficient pressure-sensitive adhesive force for practical use, which are objects of the present invention.

Here, the present applicants propose a curable silicone composition capable of forming a cured layer having a sufficient elastic modulus and loss coefficient (tan δ) in a flexible laminated body application in Patent Document 4. Unfortunately, while the composition specifically disclosed in the examples and the like partially discloses a combination of resin components having different weight average molecular weights, it cannot sufficiently solve the problems of the present invention.

PRIOR ART DOCUMENTS

Patent Documents

Patent Document 1: Japanese Patent Application Publication No. 2006-225420 A
Patent Document 2: Japanese Patent Application Publication No. H05-214316 A
Patent Document 3: WO 2017/082654 A1
Patent Document 4: WO 2017/188308 A1

SUMMARY OF THE INVENTION

Problems to be Solved by the Invention

In order to solve the aforementioned problems, an object of the present invention is to provide a curing reactive organopolysiloxane composition that forms a pressure-sensitive adhesive layer having practically sufficient curability and pressure-sensitive adhesive strength, and a relatively high shear storage elastic modulus and tensile stress at 500% strain. Another object of the present invention is to provide a use of the curing reactive organopolysiloxane composition or a cured product thereof as a pressure-sensitive adhesive layer, a use of the same as an elastic pressure-sensitive adhesive member in various applications, and an apparatus or device provided therewith.

Means for Solving the Problems

As a result of conducting diligent research on the problems described above, the present inventors arrived at the present invention. In other words, one of the objects of the present invention is achieved by a hydrosilylation reaction curable organopolysiloxane composition for forming a pressure-sensitive adhesive layer using an organopolysiloxane resin in which the sum of contents of hydroxyl groups and hydrolyzable groups relative to all silicon atoms in a molecule is 9 mol % or less and a weight average molecular weight (Mw) is 4500 or more, using as a main agent a chain organopolysiloxane having a content of vinyl ($CH_2$=CH) portions in the alkenyl groups within a range of 0.04 to 0.300 mass %, wherein a mass ratio of the organopolysiloxane resin to the chain organopolysiloxane is adjusted to a range of 1.4 to 3.0, and wherein a pressure-sensitive adhesive layer obtained by curing the composition has a shear storage elastic modulus G' at 25° C. of 1.0 MPa or more and a stress at 500% strain at 25° C. of 0.50 MPa or more. Furthermore, the aforementioned problem may be resolved by a use of the curing reactive organopolysiloxane composition or a cured product thereof as a pressure-sensitive adhesive layer, use of the same as a membrane for an electronic material, display device member, a speaker, or the like, and an electronic component, display device, or speaker provided therewith.

Effects of the Invention

The organopolysiloxane composition for forming a pressure-sensitive adhesive layer of the present invention has excellent curability and pressure-sensitive adhesive strength due to a hydrosilylation reaction, and can form a pressure-sensitive adhesive layer having a relatively high shear storage elastic modulus and tensile stress at 500% strain. Furthermore, the curing reactive organopolysiloxane composition or a cured product thereof can be suitably used as a pressure-sensitive adhesive layer, electronic material, or a display device member. An electrical or electronic component or display device provided therewith satisfies the aforementioned required properties, solves problems with curing failures, and has sufficient viscoelasticity of an adhesive layer in a wide temperature region including low temperatures. Therefore, a pressure-sensitive adhesive layer can be formed in which a problem with failures of close fitting properties to a substrate of an electronic component and the like in a temperature region including low temperatures to room temperature is unlikely to occur. Thus, industrialization can be expected to be simple, and improvements in the performance of a laminated body of an obtained display device, speaker, or the like can be expected.

MODE FOR CARRYING OUT THE INVENTION

[Organopolysiloxane Composition for Forming a Pressure-Sensitive Adhesive Layer]

First, the organopolysiloxane composition for forming a pressure-sensitive adhesive layer according to the present invention will be described. The composition quickly cures by a curing reaction including a hydrosilylation reaction to form a pressure-sensitive adhesive layer having a relatively high shear storage elastic modulus and stress at 500% strain and having practically sufficient adhesive strength. Hereinafter, each component thereof, the range of the organopolysiloxane resin mixture (which is a technical characteristic), the mass ratio of the organopolysiloxane resin to the chain organopolysiloxane, and the characteristics of the pressure-sensitive adhesive layer will be described below.

The organopolysiloxane composition of the present invention selectively uses an organopolysiloxane resin having a high molecular weight, in which the sum of contents of hydroxyl groups and hydrolyzable groups relative to all silicon atoms in the molecule is 9 mol % or less, and uses as a main agent a chain organopolysiloxane in which the content of vinyl ($CH_2$=CH) portions in the alkenyl groups is within a range of 0.02 to 0.300 mass %. The combination range of the organopolysiloxane resin relative to the chain organopolysiloxane in the composition is within a specific range. A pressure-sensitive adhesive layer obtained by curing the composition having the characteristics has a shear storage elastic modulus G' at 25° C. of 1.0 MPa or more, a stress at 500% strain at 25° C. of 0.50 MPa or more, and preferably further has a practically sufficient pressure-sensitive adhesive strength.

Specifically, the organopolysiloxane composition of the present invention contains:
(A) a chain organopolysiloxane having on average more than one alkenyl group in a molecule and in which the content of vinyl ($CH_2$=CH) portions in the alkenyl groups is within a range of 0.02 to 0.300 mass %;
(B) an organopolysiloxane resin, wherein the total content of hydroxyl groups and hydrolyzable groups relative to all silicon atoms in a molecule is 9 mol % or less, and the weight average molecular weight (Mw) measured in terms of standard polystyrene by gel permeation chromatography (GPC) is 4500 or more;
(C) an organohydrogenpolysiloxane having at least two Si—H bonds in a molecule;
(D) an effective amount of a hydrosilylation reaction catalyst; and
optionally, (A') a chain organopolysiloxane not containing a reactive group containing a carbon-carbon double bond in a molecule.

Furthermore, the composition contains a hydrosilylation reaction catalyst. Therefore, the composition may further contain (E) a curing retarder from the perspective of handling workability, and may further contain another additive within a scope that does not contradict the object of the present invention. Hereinafter, each component will be described.

The alkenyl group-containing organopolysiloxane for component (A) is a chain polysiloxane molecule containing a certain content or more of an alkenyl group, is the main agent (base polymer) of the composition, and contains on average more than one alkenyl group bonded to silicon atom in a molecule, where the preferred number of alkenyl groups is 1.5 or more in a molecule. Examples of the alkenyl groups in the organopolysiloxane for component (A) include alkenyl groups having a carbon number of 2 to 10, and vinyl groups or hexenyl groups are particularly preferable. Examples of the bonding position of the alkenyl groups in component (A) include the molecular chain terminals and/or the molecular side chains. From the perspective of the technical effect of the present invention, at least a portion or all of component (A) preferably has an alkenyl group bonded to a silicon atom at a site other than an end of a molecular chain, and the use of a chain organopolysiloxane having an alkenyl group on a side chain of a molecular chain is one preferred embodiment of the present invention. Note that component (A) may contain a single component or may be a mixture of two or more different components.

In the organopolysiloxane for component (A), examples of organic groups bonded to silicon atoms other than alkenyl groups include methyl groups and other alkyl groups; phenyl groups and other aryl groups; aralkyl groups; alkyl halide groups; and the like. Methyl groups and phenyl groups are particularly preferred.

Component (A) is different from component (B) and has a chain polysiloxane molecular structure. For example, component (A) is preferably a straight chain or a partially branched straight chain (a branched chain) and may partially include a cyclic three-dimensional network. Preferably, the main chain consists of repeating diorganosiloxane units and is preferably a straight-chain or branched-chain diorganopolysiloxane capped at both molecular terminals with triorganosiloxy groups. Note that the siloxane units which provide a branched-chain organopolysiloxane are T units or Q units described below.

The properties of component (A) at room temperature may be those of an oily or raw rubber-like substance, with a viscosity of component (A) being no lower than 50 mPa·s and particularly preferably no lower than 100 mPa·s at 25° C. In particular, when the organopolysiloxane composition according to the present invention is a solvent type, at least a portion of component (A) is (A1) a raw rubber-like alkenyl group-containing organopolysiloxane having a viscosity of no less than 100,000 mPa·s at 25° C. or having a plasticity (the thickness when a 1 kgf load applied for 3 minutes to a 4.2 g spherical sample at 25° C. was read up to 1/100 mm and this value was multiplied by 100) within a range of from 50 to 200, more preferably within a range of from 80 to 180 as measured in accordance with the method as prescribed in JIS K6249.

Note that in order to prevent contact failure and the like, these alkenyl group-containing organopolysiloxanes preferably have volatile or low molecular weight siloxane oligomers (octamethyltetrasiloxane (D4), decamethylpentasiloxane (D5), and the like) reduced or eliminated. While the degree can be designed as desired, it may be less than 1 mass % of the total component (A), less than 0.1 mass % for each siloxane oligomer, and may be reduced to the vicinity of the detection limit as required.

From the perspective of improving the technical effect of the present invention, particularly the shear storage elastic modulus at room temperature (25° C.) as well as the tensile stress and the pressure-sensitive adhesive strength at 500% strain, the content of vinyl ($CH_2=CH$) portions in the alkenyl groups in component (A) (hereinafter referred to as the "content of vinyl") must be within a range of 0.02 to 0.300 mass %, and is preferably within a range of 0.04 to 0.27 mass %. If the content of vinyl in component (A) is outside the aforementioned range, a pressure-sensitive adhesive layer having the shear storage elastic modulus, tensile stress, and practical pressure-sensitive adhesive strength, which are objects in the present invention, may not be obtained.

Even component (A) having a lower viscosity than the abovementioned component (A1) is available as component (A) of the present invention. Specifically, (A2) an organopolysiloxane containing alkenyl groups having a viscosity of less than 100,000 mPa·s at 25° C. is available. Here, examples other than the viscosity of component (A2) are the same as component (A1).

In terms of the technical effects of the present invention, 50 mass % or more of component (A) is preferably an alkenyl group-containing organopolysiloxane with a high degree of polymerization, which is component (A1), with 75 to 100 mass % thereof particularly preferably component (A1). That is, when component (A1) (=an alkenyl group-containing organopolysiloxane with a higher degree of polymerization) and component (A2) (=an alkenyl group-containing organopolysiloxane with a lower degree of polymerization) are used in combination as component (A) of the present invention, the mass ratios of both thereof range from 50:50 to 100:0, more suitably 75:25 to 100:0 or 75:25 to 90:10.

[Other Cyclic Siloxanes and Organosilicon Compounds which have an Alkenyl Group]

In the present invention, a small amount of cyclic siloxanes having an alkenyl group such as 1,3,5,7-tetramethyl-1,3,5,7-tetravinylcyclotetrasiloxane, may be optionally used together with component (A). These cyclic siloxanes may serve as reactive diluents or curing reactivity control agents and may be used if necessary.

Similarly, organosilicon compounds having on average more than one alkenyl group in a molecule and which do not fall under component (A), component (B), and the cyclic siloxanes having an alkenyl group described above may be optionally used together with component (A). These organosilicon compounds are usually reaction mixtures of alkenyl group-containing silanes and alkenyl group-containing silane-siloxanes used as independent adhesion imparting agents in curable siloxane compositions, and are different components from the polydialkylsiloxanes and other polyorganosiloxane components or organopolysiloxane resin components. These organosilicon compounds having an alkenyl group and in addition to having an epoxy group in a molecule have excellent handling workability, and can impart favorable adhesiveness to various base materials in addition to rapidly curing by a hydrosilylation curing reaction without loss of viscoelastic properties such as shear storage elastic modulus G' at room temperature or the like. In particular, a pressure-sensitive adhesive layer having excellent tensile adhesive strength may be formed.

The organopolysiloxane resin (B) is an organopolysiloxane resin with a large average molecular weight in which the content of hydroxyl groups or hydrolyzable groups is suppressed, and is one of the characteristic configurations of the present invention. Such an organopolysiloxane resin is an pressure-sensitive adhesion imparting component that imparts pressure-sensitive adhesion to a substrate, and is also a component that achieves the storage elastic modulus, stress, and practical pressure-sensitive adhesion range, which are the objects of the present invention, when used at a certain ratio with component (A).

Specifically, component (B) is an organopolysiloxane resin, where the total content of hydroxyl groups and hydrolyzable groups relative to all silicon atoms in a molecule is 9 mol % or less, and the weight average molecular weight (Mw) measured in terms of standard polystyrene by gel permeation chromatography (GPC) is 4500 or more.

In component (B) in the present invention, the sum of the contents of hydroxyl groups and hydrolyzable groups in a molecule is within a range of 9 mol % or less relative to all silicon atoms in the organopolysiloxane resin molecule, and preferably 7 mol % or less relative to all silicon atoms in the molecule. Note that in component (B), the contents of such hydroxyl groups and hydrolyzable groups can be expressed by converting all of these functional groups into hydroxyl groups. In this case, when the mass % is calculated assuming that all of the hydrolyzable groups other than the hydroxyl groups in the organopolysiloxane resin molecule are hydroxyl groups (OH), the sum of the contents of the aforementioned hydroxyl groups and hydrolyzable groups can be expressed such that the contents of these hydrolyzable groups which are converted into hydroxyl groups and hydroxyl groups in the organopolysiloxane resin molecule is 2.0 mass % or less, and preferably 1.6 mass % or less. The hydroxyl groups or hydrolysable groups are groups which are directly bonded to silicon of the T units or Q units and the like among the siloxane units in the below-mentioned resin structure, and obtained by hydrolyzing the silane or silane derivative which is the raw material. Consequently, the content of hydroxyl groups or hydrolyzable groups can be reduced by hydrolyzing the synthesized organopolysiloxane resin with a silylating agent such as trimethylsilane.

In component (B), when the content of the hydroxyl groups or hydrolyzable groups exceeds the aforementioned upper limit, a condensation reaction between organopolysiloxane resin molecules proceeds, thereby facilitating the formation of an organopolysiloxane resin structure having a large molecular weight in a cured product. The present invention intentionally uses a high molecular weight organopolysiloxane resin selectively, but a organopolysiloxane resin having a large molecular weight generated by a condensation reaction that proceeds afterwards tends to impair the curability of the composition as a whole. Thus, a resulting pressure-sensitive adhesive layer may not have a practically sufficient storage elastic modulus, tensile stress, or pressure-sensitive adhesion.

Component (B) is an organopolysiloxane resin and is an organopolysiloxane having a three-dimensional structure. Examples include: resins containing an $R_2SiO_{2/2}$ unit (D unit) and $RSiO_{3/2}$ unit (T unit) (where R mutually independently represents a monovalent organic group) and having a content of hydroxyl groups or hydrolyzable groups within the aforementioned range; resins containing only a T unit and having a content of hydroxyl groups or hydrolyzable groups within the aforementioned range; resins containing an $R_3SiO_{1/2}$ unit (M unit) and $SiO_{4/2}$ unit (Q unit) and having a content of hydroxyl groups or hydrolyzable groups within the aforementioned range; and the like. In particular, a resin (also referred to as MQ resin) is preferably used, which contains an $R_3SiO_{1/2}$ unit (M unit) and $SiO_{4/2}$ unit (Q unit) and where the sum of the content of hydroxyl groups and hydrolyzable groups relative to all silicon atoms in the molecule is 0 to 7 mol % (and preferably within a range of 0.0 to 1.6 mass % when all of these functional groups are converted into hydroxyl groups).

The monovalent organic group of R is preferably a monovalent hydrocarbon group having a carbon number of from 1 to 10, with examples thereof including alkyl groups having a carbon number of from 1 to 10, alkenyl groups having a carbon number of from 2 to 10, aryl groups having a carbon number of from 6 to 10, cycloalkyl groups having a carbon number of from 6 to 10, benzyl groups, phenylethyl groups, and phenylpropyl groups. In particular, 90 mole % or more of R is preferably alkyl groups having 1 to 6 carbon atoms or phenyl groups, while 95 to 100 mole % of R is particularly preferably methyl groups or phenyl groups.

When component (B) is a resin containing an $R_3SiO_{1/2}$ unit (M unit) and $SiO_{4/2}$ unit (Q unit), the molar ratio of M units to Q units is preferably from 0.5 to 2.0. This is because when the molar ratio is less than 0.5, the adhesive force to the substrate may be diminished, whereas when the molar ratio is greater than 2.0, the cohesive strength of the material constituting the adhesive layer decreases. Moreover, D units and T units may also be included in component (B) to an extent that does not impair the characteristics of the present invention. Further, in order to prevent contact failure and the like, these organopolysiloxane resins may have a low molecular weight siloxane oligomer reduced or eliminated.

The organopolysiloxane resin for component (B) has a weight average molecular weight (Mw) that is 4500 or more, preferably 5000 or more, and particularly preferably 5500 or more. In practical use, component (b1) is particularly suitably a resin containing the aforementioned $R_3SiO_{1/2}$ unit (M unit) and $SiO_{4/2}$ unit (Q unit), where the weight average molecular weight (Mw) is within a range of 5000 to 10000.

[Mass Ratio of Component (B) to Components (A) and (A')]

The organopolysiloxane composition for forming a pressure-sensitive adhesive layer according to the present invention characteristically has a mass ratio of component (B) (which is an organopolysiloxane resin) to components (A) and (A') described later (which are chain reactive siloxane components) within a range of 1.4 to 3.0. This is because when the aforementioned organopolysiloxane resin is selected as component (B), and the aforementioned resin component is blended so as to be within the aforementioned range with regard to the chain siloxane polymer component, a high storage elastic modulus at room temperature, stress, and other viscoelastic properties, which are objects of the present invention, are suitably achieved. In particular, from the perspective of increasing the pressure-sensitive adhesive strength of a resulting pressure-sensitive adhesive layer, the mass ratio of component (B) to components (A) and (A') described later may be within a range of 1.5 to 3.0, and in order to achieve a desired pressure-sensitive adhesive strength and storage elastic modulus, is particularly preferably within a range of 1.5 to 2.3. In contrast, when the mass ratio of component (B) to components (A) and (A') described later is outside the aforementioned range, properties such as curability, pressure-sensitive adhesive strength, storage elastic modulus, and the like, which are objects of the present invention, may not be achieved even when other configurations are adjusted.

Component (C) is an organohydrogenpolysiloxane having two or more Si—H bonds in a molecule and is a crosslinking agent of the organopolysiloxane composition of the present invention. The molecular structure of component (C) is not particularly limited, and examples thereof include a straight chain, a partially branched straight chain, a branched chain, a cyclic, or an organopolysiloxane resin structure, and a straight chain, a partially branched straight chain, or an organopolysiloxane resin structure is preferable. The bonding position of silicon atom-bonded hydrogen atoms is not particularly limited, with examples thereof including molecular terminals, side chains, and both molecular terminals and side chains.

A content of the silicon atom-bonded hydrogen atoms is preferably from 0.1 to 2.0 mass % and more preferably from 0.5 to 1.7 mass %.

Examples of the organic groups bonded to silicon atoms include methyl groups and other alkyl groups having 1 to 8 carbon atoms; phenyl groups and other aryl groups; aralkyl groups; and alkyl halide groups. From the perspective of ease of manufacturing and compatibility with the preferred component (A) and component (B) described above, the other organic groups are preferably methyl groups or phenyl groups.

Specific examples of component (C) include tris(dimethylhydrogensiloxy)methylsilane, tetra(dimethylhydrogensiloxy)silane, methylhydrogenpolysiloxanes capped at both terminals with trimethylsiloxy groups, copolymers of dimethylsiloxane and methylhydrogensiloxane capped at both terminals with trimethylsiloxy groups, copolymers of dimethylsiloxane and methylhydrogensiloxane capped at both terminals with dimethylhydrogensiloxy groups, cyclic methylhydrogen oligosiloxanes, cyclic copolymers of methylhydrogensiloxane and dimethylsiloxane, copolymers of methylhydrogensiloxane and diphenylsiloxane capped at both molecular terminals with trimethylsiloxy groups, copolymers of methylhydrogensiloxane, diphenylsiloxane and dimethylsiloxane capped at both molecular terminals with trimethylsiloxy groups, hydrolytic condensates of trimethylsilanes, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)SiO_{3/2}$ units, copolymers consisting of $(CH_3)_2HSiO_{1/2}$ units and $CH_3SiO_{3/2}$ units, and mixtures of two or more types thereof.

[SiH/Vi Ratio]

The composition of the present invention is hydrosilylation reaction curable, and an amount of component (C)

used is not particularly limited so long as the composition can be sufficiently cured via a hydrosilylation reaction. However, the substance amount of silicon atom-bonded hydrogen atom (SiH) groups in component (C) relative to the sum of the amount (substance amount) of alkenyl groups in component (A) and the amount (substance amount) of alkenyl groups in component (B) in the composition, in other words, the molar ratio, is preferably within a range of 0.1 to 100, but may be within a range of 0.5 to 60, within a range of 1.0 to 50, or within a range of 1.0 to 40.

In contrast, in order to improve adhesion to a substrate of glass and the like, the amount of SiH groups can be designed so as to be 10 or more and 20 or more, preferably more than 20, and more preferably 22 or more. For example, the mass amount of silicon atom-bonded hydrogen atom (SiH) groups in component (C) relative to the sum of the amount (mass amount) of alkenyl groups in component (A) and the amount (mass amount) of alkenyl groups in component (B) in the composition can be designed so as to be within a range of 20 to 60 or a range of 22 to 50. When the amount of the SiH groups falls below the abovementioned lower limit, the technical effect of improving adhesion to the substrate may not be achieved. In contrast, when the amount of the SiH groups exceeds the abovementioned upper limit, the amount of unreacted residual curing agent becomes large, potentially having adverse effects on curing physical properties such as the brittleness of the cured product or potentially causing problems such as gas generation. However, a practically sufficient pressure-sensitive adhesive layer can be formed even when the SiH/Vi ratio of the composition is outside the aforementioned range.

Note that when cyclic siloxanes and organosilicon compounds, which have an alkenyl group, other than components (A) and (B) are optionally used, from the perspective of the curability of the composition according to the present invention, the amount of silicon atom-bonded hydrogen atom (SiH) groups in component (C) relative to the total amount (mass amount) of alkenyl groups in the composition including these components is preferably 1.0 or more, and the mass amount of the silicon atom-bonded hydrogen atom (SiH) groups in component (C) may be within a range of 1.5 to 60, or may be within a range of 20 to 60.

[Hydrosilylation Reaction Catalyst]

The organopolysiloxane composition of the present invention contains a hydrosilylation reaction catalyst. Examples of hydrosilylation reaction catalysts include platinum-based catalysts, rhodium-based catalysts, and palladium-based catalysts, with platinum-based catalysts being preferable in that they markedly accelerate the curing of the present composition. The platinum-based catalyst is preferably a platinum-alkenylsiloxane complex, and particularly preferably 1,3-divinyl-1,1,3,3-tetramethyldisiloxane due to the favorable stability of the platinum-alkenylsiloxane complex. As the catalyst for promoting the hydrosilylation reaction, a non-platinum based metal catalyst such as iron, ruthenium, iron/cobalt, or the like may be used.

In the present invention, the amount of the hydrosilylation reaction catalyst is not particularly limited. The amount of platinum-based metals may be, relative to the total amount of solid fractions in the composition, within a range of 0.1 to 200 ppm, may be within a range of 0.1 to 150 ppm or 0.1 to 100 ppm, and may be within a range of 0.1 to 50 ppm. In practical use, the amount of the platinum metal excluding a ligand of the hydrosilylation reaction catalyst is preferably within the ranges described above. Note that the solid content is a component that forms the cured layer (primarily a main agent, an adhesion-imparting component, a cross-linking agent, a catalyst, and other non-volatile components) when the organopolysiloxane composition of the present invention is subjected to a curing reaction, and does not include volatile components such as solvents that volatilize at the time of heat curing.

When the amount of the platinum-based metal in the organopolysiloxane composition according to the present invention is 50 ppm or less (45 ppm or less, 35 ppm or less, 30 ppm or less, 25 ppm or less, or 20 ppm or less), discoloration or coloration of the transparent pressure-sensitive adhesive layer may be suppressed, particularly after curing or when heated or exposed to high-energy rays such as UV rays or the like. Meanwhile, from the perspective of the curability of the organopolysiloxane composition, the amount of the platinum-based metal is no lower than 0.1 ppm, because when the amount is lower than this lower limit, this may cause curing defects.

Component (E) is a curing retarder and is compounded in order to suppress crosslinking reactions between the alkenyl groups in the composition and the SiH groups in component (C) so as to extend the usable life at ordinary temperatures and enhance the storage stability. Accordingly, in practical use, the component is a nearly essential component for the organopolysiloxane composition for forming a pressure-sensitive adhesive layer of the present invention.

Specific examples of component (E) include acetylenic compounds, ene-yne compounds, organic nitrogen compounds, organic phosphorus compounds, and oxime compounds. Specific examples include: alkyne alcohols such as 3-methyl-1-butyn-3-ol, 3,5-dimethyl-1-hexyn-3-ol, 3-methyl-1-pentyn-3-ol, 1-ethynyl-1-cyclohexanol, phenyl butynol, and the like; ene-yne compounds such as 3-methyl-3-penten-1-yne, 3,5-dimethyl-1-hexyn-3-yne, and the like; 2-ethynyl-4-methyl-2-pentene, methylalkenylcyclosiloxanes such as 1,3,5,7-tetramethyl-1,3,5,7-tetravinylcyclotetrasiloxane, 1,3,5,7-tetramethyl-1,3,5,7-tetrahexenylcyclotetrasiloxane, and the like, as well as benzotriazoles.

From the perspective of the curing behavior of the composition, the organopolysiloxane composition for forming a pressure-sensitive adhesive layer of the present invention is preferably curable at 80 to 200° C., with an increase in viscosity of 1.5-fold after 8 hours at room temperature following the preparation of the composition. The suppression of thickening is important from the perspective of handleability, pot life, and characteristics after curing and contains a large excess of component (C), wherein, even if the amount of the platinum-based metal is optionally low, the curability can be ensured by curing at high temperatures of at least a certain temperature (80 to 200° C.). Note that such a composition can be achieved by selecting a suitable combination and compounded amounts of each of the components described above, the hydrosilylation catalyst, and component (E).

In addition to the preferred components (A) and (B) described above, the organopolysiloxane composition of the present invention may also contain an organic solvent as a solvent. The type and blending amount of the organic solvent is adjusted taking the coating workability and the like into consideration. Exemplary organic solvents include: aromatic hydrocarbon-based solvents such as toluene, xylene, and benzene; aliphatic hydrocarbon-based solvents such as heptane, hexane, octane, and isoparaffin; ester-based solvents such as ethyl acetate and isobutyl acetate; ether-based solvents such as diisopropyl ether and 1,4-dioxane; chlorinated aliphatic hydrocarbon-based solvents such as trichloroethylene, perchloroethylene, and methylene chloride; and solvent volatile oils, with two or more types capable of being combined in accordance with the wettability of the sheet-like substrate or the like. A compounded amount of the organic solvent is preferably an amount such that a mixture of components (A) to (C) can be uniformly applied to a sheet-like substrate surface. For example, the compounded amount may be from 5 to 300 parts by mass per total of 100 parts by mass of components (A), (B) and (C).

The organopolysiloxane composition of the present invention may optionally contain components other than the components described above to an extent that does not impair the technical effects of the present invention. Examples can include: adhesion promoters; polydimethylsiloxane, polydimethyldiphenylsiloxane, and other non-reactive organopolysiloxanes; antioxidants; light stabilizers; flame retardants; one or more types of antistatic agents; and the like. Note that, in addition to these components, pigments, dyes, inorganic microparticles (reinforcing fillers, dielectric fillers, conductive fillers, thermally conductive fillers), and the like can be optionally blended.

[(A') Chain Organopolysiloxane which does not Contain a Carbon-Carbon Double Bond-Containing Reactive Group in a Molecule]

The organopolysiloxane composition according to the present invention can blend a non-reactive organopolysiloxane such as a polydimethylsiloxane, polydimethyldiphenylsiloxane, or the like that does not contain a carbon-carbon double bond-containing reactive group such as an alkenyl group, acryl group, methacryl group, or the like. As a result, it may be possible to improve a loss coefficient (tan $\delta$), storage elastic modulus (G'), and a loss modulus (G") of the pressure-sensitive adhesive layer. For example, the loss coefficient of the pressure-sensitive adhesive layer can be increased using a polydimethylsiloxane having a hydroxyl group end and a polydimethylsiloxane or polydimethyldiphenylsiloxane having a trimethylsiloxy end, and such compositions are included within the scope of the present invention.

Herein, component (A') is a chain organopolysiloxane that is not involved in the curing reaction by hydrosilylation, and the mass ratio of component (B) in the composition can affect the properties of the composition, such as the pressure-sensitive adhesive strength, storage elastic modulus, and the like. As described above, the mass ratio of component (B) to components (A) and (A') may be within a range of 1.4 to 3.0, and in order to achieve a desired pressure-sensitive adhesive strength and storage elastic modulus, is particularly preferably with a range of 1.5 to 3.0. Note that the mass ratio of component (A) to component (A') is not particularly limited, but may be designed to be within a range of 100:0 to 60:40, 100:0 to 65:35, 90:10 to 65:35, 85:15 to 70:30, or the like, depending on the desired storage elastic modulus and the mass ratio to component (B)

The method of preparing the organopolysiloxane composition of the present invention is not particularly limited and is performed by homogeneously mixing the respective components. A solvent may be added as necessary and the composition may be prepared by mixing at a temperature of from 0 to 200° C. using a known stirrer or kneader.

The organopolysiloxane composition of the present invention forms a coating film when applied to a substrate and forms a cured product by heating under temperature conditions of from 80 to 200° C. and preferably under temperature conditions of from 90 to 190° C. Examples of application methods include gravure coating, offset coating, offset gravure, roll coating, reverse roll coating, air knife coating, curtain coating, and comma coating. The coating amount can be designed at a desired thickness in accordance with the application such as a display device; for example, the thickness of the pressure-sensitive adhesive layer after curing may be from 1 to 1000 µm, from 5 to 900 µm, or from 10 to 800 µm; however, there is no limitation thereto.

[Range of Pressure-Sensitive Adhesion and Adhesive Force]

The organopolysiloxane composition of the present invention is characterized in that a cured layer obtained by curing the composition by a hydrosilylation reaction is a pressure-sensitive adhesive. Because the pressure-sensitive adhesive layer according to the present invention has the abovementioned configuration and expresses sufficient adhesive force for practical use, a known silicone pressure-sensitive adhesive can be replaced and used as desired.

Specifically, a pressure-sensitive adhesive layer can be designed such that the pressure-sensitive adhesive force of the pressure-sensitive adhesive layer having a thickness of 50 µm obtained by curing the organopolysiloxane composition of the present invention, as measured at a tension rate of 300 mm/min using a 180° peeling test method in accordance with JIS Z 0237 for a polymethyl methacrylate sheet having a thickness of 2 mm, is 1300 gf/inch or more, preferably 1400 gf/inch or more, and particularly preferably within a range of 1300 to 2500 gf/inch. A pressure-sensitive adhesive layer having the pressure-sensitive adhesive force within a range of 1400 to 2000 gf/inch is preferable. Note that the thickness (50 µm) described above is the thickness of the cured layer itself serving as a reference for objectively defining the adhesive force of the cured layer of the present invention. It goes without saying that the organopolysiloxane composition of the present invention is not limited to a thickness of 50 µm and may be used as a cured layer or a pressure-sensitive adhesive layer of any thickness.

[Storage Elastic Modulus and Other Mechanical Properties]

The pressure-sensitive adhesive layer obtained by curing the organopolysiloxane composition for forming a pressure-sensitive adhesive layer of the present invention has a shear storage elastic modulus G' at 25° C. of is 1.0 MPa, and preferably within a range of 1.5 to 10 MPa, and the shear storage elastic modulus G' within a range of 1.5 to 7.5 MPa is preferably included within the scope of the present invention.

Furthermore, the composition of the present invention is characterized by a relatively high tensile stress at 500% strain at 25° C. of the pressure-sensitive adhesive layer obtained by curing the composition. Specifically, the tensile stress is 0.50 MPa or more, and preferably within a range of 0.50 to 5.0 MPa, and the stress being with a range of 1.0 to 3.0 MPa is suitably included within the scope of the present invention.

The organopolysiloxane composition for forming a pressure-sensitive adhesive layer according to the present invention, which has the storage elastic modulus G' at room temperature, relatively high tensile stress, and practically sufficient pressure-sensitive adhesive force, is suitable as a member of a speaker, transducer, or other electronic apparatus or electrical device and suitable for applications in the field of advanced electronics materials and display elements such as smart devices and the like, in order to form an elastic pressure-sensitive adhesive member.

The storage elastic modulus (G') of the pressure-sensitive adhesive layer according to the present invention can be measured via a known measurement method. For example, measurements can be performed using a storage elastic modulus (G') MCR301 viscoelastic measurement device (available from Anton Paar). Using a disk shaped sample with a diameter of approximately 8 mm and a thickness of approximately 0.5 to 1 mm, the value can be measured as a value at 25° C. by performing measurements within a range of −70° C. to 250° C. utilizing an 8 mm parallel plate at a frequency of 1 Hz, a strain of 0.1%, and a temperature increase rate of 3° C./minute.

The pressure-sensitive adhesive layer according to the present invention may have a storage elastic modulus G' at 1.0 Hz at −20° C. which is no less than three-fold the storage elastic modulus G' at 1.0 Hz at 25° C.

[Properties Relating to Transparency, Color Tone, or Coloration and Discoloration of the Pressure-Sensitive Adhesive Layer]

The organopolysiloxane composition of the present invention may be substantially transparent, translucent, or opaque, such that the transparency thereof can be designed in accordance with the application of the pressure-sensitive adhesive layer. For example, as a pressure-sensitive adhesive layer for a display device, a film-like cured product with a thickness of 10 to 1000 μm obtained by curing the organopolysiloxane composition of the present invention is preferably visually transparent, and preferably does not contain a coloring additive such as carbon black or the like. Note that when it is visually transparent, or more objectively, when the value for air is 100%, the transmittance of light at a wavelength of 450 nm of the pressure-sensitive adhesive layer for a display device formed from a cured layer having a thickness of 100 μm is 80% or higher and suitably 90% or higher, and may be designed so as to be 95% or higher. In contrast, in the adhesion and the like of the electrical or electronic part which does not require light transmittance, a semi-transparent to opaque pressure-sensitive adhesive layer may be used, with a filler component or additive which impairs colorability or light transmittance capable of being used depending on the required characteristics other than light transmittance.

The organopolysiloxane composition of the present invention can be designed such that a cured product is not colored, in addition to the aforementioned transparency, by optionally reducing the amount of the platinum-based metal in the cured layer. Specifically, the b* value, which is measured with the L*a*b* color system as specified in JIS Z 8729, immediately after curing a cured layer having a thickness of 100 μm obtained by curing the organopolysiloxane composition of the present invention can be designed so as to be 0.15 or less and even 0.10 or less. Having such b* values means that the cured layer is substantially transparent and not yellow colored.

Even when the cured layer of the present invention is exposed to high temperatures or high-energy beams such as UV rays for an extended period of time, it can be designed such that the color tone thereof does not change significantly and the problem of yellowing, in particular, does not occur. Specifically, even if any of the following evaluations are made, the change (Δb*) in the b* value measured with the L*a*b* color system as specified in JIS Z 8729 immediately after evaluation, for a cured layer having a thickness of 100 μm obtained by curing the organopolysiloxane composition of the present invention, can be designed so as to be 0.20 or less and even 0.15 or less. Note that Δb* is an absolute value of the numerical change.

(1) Thermal aging evaluation: The cured layer is aged for 300 hours at 105° C.
(2) High-energy beam irradiation: A sample of the cured layer is irradiated for 75 hours at room temperature with a UV light using a mercury lamp (for example, Optical ModuleX or the like manufactured by Ushio Electric Co., Ltd.) having an intensity of 12 mW/cm$^2$ at 365 nm and an intensity of 3.5 mW/cm$^2$ at 254 nm.

[Use as a Pressure-Sensitive Adhesive Layer]

The cured product of the present invention can, in particular, be used as a pressure-sensitive adhesive layer. In addition, in order to improve adhesion with the adherend, surface treatment such as primer treatment, corona treatment, etching treatment, or plasma treatment may be performed on the surface of the pressure-sensitive adhesive layer or the substrate. However, because the pressure-sensitive adhesive layer according to the present invention has excellent adhesion to a substrate of a display device and the like as described above, these steps may be added, as required, to further improve adhesion with the adherend, with a higher production efficiency capable of being achieved by eliminating these steps.

The curable organopolysiloxane composition of the present invention is cured by applying the composition to a release liner, then heating under the temperature conditions described above, and, after the release liner is peeled off and the cured product is attached to a film-like substrate, a tape-like substrate, or a sheet-like substrate (hereinafter, referred to as a "film-like substrate") or applied to a film-like substrate, curing by heating at the temperature conditions described above so as to form a pressure-sensitive adhesive layer on the surface of the substrate. A laminate provided with a cured layer, in particular, a film-like pressure-sensitive adhesive layer, obtained by curing the organopolysiloxane composition of the present invention on these film-like substrates may be used for adhesive tapes, adhesive bandages, low-temperature supports, transfer films, labels, emblems, and decorative or explanatory signs. Further, a cured layer obtained by curing the organopolysiloxane composition of the present invention may be used to assemble automobile parts, toys, electronic circuits, or keyboards. Alternatively, a cured layer formed by curing the organopolysiloxane composition of the present invention, particularly a film-like pressure-sensitive adhesive layer, may be used in the construction and use of a laminated touch screen or flat panel display. Note that an opposite surface of the film-like substrate from the pressure-sensitive adhesive layer surface may be subjected to surface treatments such as a treatment for scratch prevention, grime prevention, fingerprint adhesion prevention, anti-glare, anti-reflection, anti-static, or other treatment.

Exemplary types of substrates include paperboard, cardboard paper, clay-coated papers, polyolefin laminate papers, particularly polyethylene laminate papers, synthetic resin films and sheets, natural fiber woven materials, synthetic fiber woven materials, artificial leather woven materials, and metal foils.

The pressure-sensitive adhesive layer according to the present invention may be a single layer or a multilayer structure obtained by laminating two or more pressure-sensitive adhesive layers in accordance with the required characteristics. Multiple pressure-sensitive adhesive layer may be formed by bonding the pressure-sensitive adhesive films (which are formed film by film) thereto, or the step of applying and curing the pressure-sensitive adhesive layer-forming organopolysiloxane composition may be carried out multiple times on a film substrate (including a release layer) and the like.

The pressure-sensitive adhesive layer according to the present invention may serve as other functional layers selected from a dielectric layer, conductive layer, heat dissipation layer, insulating layer, reinforcing layer, and the like, in addition to providing adhering or sticking functions between members.

When the cured layer obtained by curing the organopolysiloxane composition of the present invention is a pressure-sensitive adhesive layer, in particular, a pressure-sensitive adhesive layer, the cured layer is preferably treated as a laminate film that is peelably adhered to a film substrate provided with a release layer having a release-coating capability. The release layer may suitably be a release layer having a release coating capability, such as a silicone-based release agent, a fluorine-based release agent, an alkyd-based release agent, a fluorosilicone-based release agent, or the like, or a base material itself that has physically formed minute irregularities on the surface of the base material or that is difficult to adhere to the pressure-sensitive adhesive layer of the present invention. The use of a release layer obtained by curing a fluorosilicone-based release agent is preferred. Note that in the aforementioned laminated body, the release layer may be a different release layer, which is a first release layer and a second release layer having different types of release agents and different release forces configuring the release layer. The fluorosilicone-based release agent may be a curing reactive silicone composition containing one or more types of fluorine-containing groups selected from fluoroalkyl groups and perfluoropolyether groups.

The cured product obtained by curing the organopolysiloxane composition according to the present invention has both viscoelasticity and adhesive strength as described above, making it useful as a member of various types of electronic equipment or electrical devices as elastic adhesive members. In particular, it is useful as an electronic material, a member for a display device, or a member for a transducer (including sensors, speakers, actuators, and generators), with a suitable application for the cured product being a member for an electronic part or a display device. The cured product according to the present invention may be transparent or opaque, wherein, in particular, a film-shaped cured product, particularly a substantially transparent pressure-sensitive adhesive film, is suitable as a member for a display panel or a display, and is particularly useful in so-called touch panel applications in which a device, particularly an electronic device, can be operated by touching a screen with a fingertip or the like. Moreover, the opaque elastic adhesive layer is not required to have transparency, making it particularly useful for applications of film-like or sheet-like members used in sensors, speakers, actuators, and the like, which requires constant elasticity or flexibility in the adhesive layer itself.

In particular, the pressure-sensitive adhesive layer obtained by curing the organopolysiloxane composition according to the present invention is capable of achieving a pressure-sensitive adhesive characteristic equivalent to conventional silicone pressure-sensitive adhesive layers, and can improve adhesion to a substrate of a display device and the like without causing problems due to poor curing or reduced curability.

[Member for Display Panel or Display]

A cured product obtained by curing the organopolysiloxane composition of the present invention can be used in the construction and use of a laminated touch screen or flat panel display, and the specific method of use thereof may be a known method of use of a pressure-sensitive adhesive layer (in particular, silicone PSA) without any particular limitation.

For example, a cured product obtained by curing the organopolysiloxane composition of the present invention can be used in the manufacturing of a display device such as a touch panel or the like as an optically transparent silicone-based pressure-sensitive adhesive film or a pressure-sensitive adhesive layer disclosed in Japanese Patent Application Publication (Translation of PCT Application) No. 2014-522436 A, Japanese Patent Application Publication (Translation of PCT Application) No. 2013-512326 A, or the like described above. In addition, a cured product obtained by curing the organopolysiloxane composition of the present invention may be used as an adhesive film for a polarizing plate used in the production of a display device such as a touch panel, or may be used as a pressure-sensitive adhesive layer used in bonding between a touch panel and a display module described in Japanese Patent Application Publication No. 2013-065009 A.

INDUSTRIAL APPLICABILITY

The application of the curing reactive organopolysiloxane composition of the present invention and a cured product obtained by curing the composition is not limited to those disclosed above, and the pressure-sensitive adhesive film provided with the cured product obtained by curing the composition can be used in various display devices for displaying characters, symbols and images. The surface shape of such a display device may be a curved shape or a bowed shape rather than a flat surface, with examples thereof including curved displays or curved transmission screens used in automobiles (including electric vehicles), aircraft, or the like in addition to various flat panel displays (FPDs). Further, these display devices can display icons for executing functions or programs on a screen or display, notification indicators of e-mail, programs, or the like, and operation buttons for various devices such as car navigation devices, audio devices, and air conditioning devices, with touch panel functions enabling input operations capable of being added by touching these icons, notification indicators, or operation buttons with a finger. Moreover, the cured product obtained by curing the composition has excellent adhesion and viscoelastic characteristics, enabling the use thereof as a film-like or sheet-like member which is a member for transducers such as a membrane for speakers (including a sensor, speaker, actuator, and the like), in addition to also being capable of being used as a sealing layer or adhesive layer used in a secondary battery, fuel cell, or solar cell module.

A pressure-sensitive adhesive layer obtained by curing the organopolysiloxane composition according to the present invention may be substantially transparent, without causing problems such as poor curing or reduced curability, and has excellent adhesion to substrates of various display devices and the like. Therefore, the pressure-sensitive adhesive layer can be suitably used in a vehicle display device with good visibility and operability of the display content over an extended period of time, and in particular, a vehicle display device having a curved screen or curved display and optionally equipped with a touch panel function. For example, vehicle display devices equipped with curved display surfaces are disclosed in Japanese Patent Application Publication No. 2017-047767 A, Japanese Patent Application Publication No. 2014-182335 A, Japanese Patent Application Publication No. 2014-063064 A, Japanese Patent Application Publication No. 2013-233852 A, and the like; however, the pressure-sensitive adhesive layer of the present invention can be suitably applied or replaced as part or all of an adhesive layer or a pressure-sensitive adhesive layer for which transparency is required in these documents. Further, it goes without saying that regarding the pressure-sensitive adhesive layer-forming organopolysiloxane composition according to the present invention, currently used adhesive layers or pressure-sensitive adhesive layers requiring transparency may be used as a substitute for other known curved display devices as well, and in order to further leverage the advantages of the pressure-sensitive adhesive of the present invention, it is preferable to adjust the design of the display device or the thickness of the member using known techniques.

Note that the transparent film-like substrate provided with the pressure-sensitive adhesive layer of the present invention may be used for the purpose of scratch prevention, dirt prevention, fingerprint adhesion prevention, static prevention, glare prevention, peep prevention, and the like of these display surfaces.

EXAMPLES

Examples and comparative examples of the present invention are described hereinafter. Note that "cured" in each of the examples, comparative examples, and reference examples means that each composition has fully cured under the respective curing conditions.
(Preparation of Curing Reactive Organopolysiloxane Composition)

The curing reactive organopolysiloxane compositions illustrated in each of the examples, comparative examples, and reference examples were prepared using the components shown in Table 1. Note that all percentages in Table 1 refer to percentages by mass.
(Measurement of the Molecular Weight of the Organopolysiloxane Component)

Using gel permeation chromatography (GPC) available from Waters and tetrahydrofuran (THF) as a solvent, the weight average molecular weight (Mw) and number average molecular weight (Mn) of organopolysiloxane components such as organopolysiloxane resin were determined in terms of standard polystyrene.
(Measurement of the Content of Hydroxyl Groups (OH) in Organopolysiloxane Resin)

Using an ACP-300 $^{29}$Si NMR spectrometer manufactured by Bruker provided with a glass-free probe, when the chemical shift of the tetramethylsilane was set to 0 ppm, the molar content was obtained from the presence ratio of $Si(OH)O_{2/3}$ units appearing at −93 to −103.5 ppm to all silicons, then further converted into the mass % of the hydroxyl groups (OH) in the organopolysiloxane resin. Note that hydrolyzable functional groups other than hydroxyl groups were not included in the organopolysiloxane resin in the following examples.
(Adhesive Force Measurement)

Each composition was applied to a PET film (available from Toray Co., Ltd., product name: Lumirror (registered trademark) S10, thickness: 50 μm) such that the thickness after curing was 50 μm, after which it was cured for 3 minutes at 150° C. After being left to stand for one day, the sample was cut to a width of 20 mm and the adhesive layer surface was affixed to a PMMA plate (manufactured by Paltec, ACRYLITE L001, 50×120×2 mm) using a roller to form a test piece. Regarding the test piece using the PMMA plate, the adhesive force (measurement at a width of 20 mm converted to the display unit gf/inch) was measured at a tensile speed of 300 mm/min using the 180° peeling test method in accordance with JIS Z 0237, using an RTC-1210 tensile tester manufactured by Orientec Co., Ltd.

(Dynamic Viscoelasticity: Storage Elastic Modulus G' at 25° C.)

Each composition was applied to a release liner coated via fluorosilicone release coating such that the thickness after curing was approximately 100 μm, then cured at 150° C. for three minutes. Five or more of the pressure-sensitive adhesive films were overlapped so as to obtain a film sample, both surfaces of which were sandwiched between release liners having a thickness of 500 μm or more. The film was cut to a diameter of 8 mm and adhered to the parallel plate probe of a dynamic viscoelastic device (MCR301 available from Anoton Paar) in order to determine the storage elastic modulus G'. The measurement conditions were within a range of −70° C. to 250° C., the measurements were carried out at a frequency of 1 Hz and a temperature increase rate of 3° C./minute, the loss coefficient, storage elastic modulus G', and loss modulus G" were measured, and the storage elastic modulus G' at 25° C. was recorded (units: MPa).
(Tensile Test)

A film sample having a thickness of 500 μm or more, obtained in the same manner as the abovementioned dynamic viscoelasticity test sample with both surfaces sandwiched between release liners, was cut to a width of approximately 5 mm and a length of approximately 70 mm, then the release liners were peeled off while applying baby powder to the pressure-sensitive adhesive surface to form a tensile test sample. The tensile test was carried out using Autograph AGS-X available from Shimadzu Corporation to grab approximately 25 mm above or below the sample at a speed of 300 mm/minute. Stress and strain were determined from the exact sample width and thickness of each sample and the distance between the crossheads, and the stress at 500% strain was recorded (units: MPa).

The materials of the curing reactive organopolysiloxane compositions are shown in Table 1. Note that the viscosity or plasticity of each component was measured at room temperature using the following methods.
[Viscosity]

The viscosity (mPa·s) is a value measured using a rotary viscometer conforming to JIS K7117-1, and the kinematic viscosity ($mm^2$/s) is a value measured with an Ubbelohde viscometer conforming to JIS Z8803.
[Plasticity]

The plasticity was expressed as a value measured in accordance with the method prescribed in JIS K 6249 (the thickness when a 1 kgf load was applied for 3 minutes to a 4.2 g spherical sample at 25° C. was read up to 1/100 mm, and this value was multiplied by 100).

TABLE 1

Components of the curing reactive organopolysiloxane compositions

| Component Name | Component |
|---|---|
| Component a1 | Vinyl-functional polydimethylsiloxane, gum-like (plasticity: 134), vinyl content: 0.017 mass % |
| Component a2 | Vinyl-functional polydimethylsiloxane, gum-like (plasticity: 160), vinyl content: 0.065 mass % |
| Component a3 | Vinyl-functional polydimethylsiloxane, gum-like (plasticity: 135), vinyl content: 0.222 mass % |
| Component b | MQ silicone resin containing $(CH_3)_3SiO_{1/2}$ units, $SiO_{4/2}$ units, and hydroxyl groups, Mw: 6500, OH content: 4.5 mol % (1.0 mass %), xylene solution (solid fraction: 64.0%) |
| Component c | Methylhydrogenpolysiloxane capped at both terminals of the molecular chain with trimethylsiloxy groups, viscosity: 20 $mm^2$/s, SiH content: 1.59% |

TABLE 1-continued

Components of the curing reactive
organopolysiloxane compositions

| Component Name | Component |
| --- | --- |
| Component d | Platinum-based hydrosilylation reaction catalyst containing 0.62 mass % platinum |
| Component e1 | 1-ethynyl-1-cyclohexanol, 20% toluene solution |
| Component e2 | 3,5-dimethyl-1-hexyn-3-ol |

Example 1

36.4 parts by weight of the vinyl functional polydimethylsiloxane of component a2, 99.4 parts by weight of the MQ silicone resin of component b, 30.9 parts by weight of toluene, 0.298 parts by weight of the methylhydrogenpolysiloxane of component c, and 0.491 parts by weight of the curing retarder 20% solution of component e1 were sufficiently mixed at room temperature, and then 0.355 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a2 was 5.40, while the amount of the platinum metal to the solid fraction was 22 ppm.

The composition was cured via the abovementioned method, after which the adhesive force, viscoelasticity, and stress strain on the PMMA plate were measured via the abovementioned method, the evaluation results, and the like of which were indicated in Table 2.

Example 2

34.5 parts by weight of the vinyl functional polydimethylsiloxane of component a2, 102.4 parts by weight of the MQ silicone resin of component b, 85.3 parts by weight of toluene, 0.283 parts by weight of the methylhydrogenpolysiloxane of component c, and 0.491 parts by weight of the curing retarder 20% solution of component e1 were sufficiently mixed at room temperature, and then 0.355 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a2 was 5.40, while the amount of the platinum metal to the solid fraction was 22 ppm.

The composition was cured via the abovementioned method, after which the adhesive force, viscoelasticity, and stress strain on the PMMA plate were measured via the abovementioned method, the evaluation results, and the like of which were indicated in Table 2.

Example 3

36.2 parts by weight of the vinyl functional polydimethylsiloxane of component a3, 100.3 parts by weight of the MQ silicone resin of component b, 86.0 parts by weight of toluene, 0.297 parts by weight of the methylhydrogenpolysiloxane of component c, and 0.840 parts by weight of the curing retarder 20% solution of component e2 were sufficiently mixed at room temperature, and then 0.806 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a3 was 1.55, while the amount of the platinum metal to the solid fraction was 50 ppm.

The composition was cured via the abovementioned method, after which the adhesive force, viscoelasticity, and stress strain on the PMMA plate were measured via the abovementioned method, the evaluation results, and the like of which were indicated in Table 2.

Example 4

36.4 parts by weight of the vinyl functional polydimethylsiloxane of component a2, 99.4 parts by weight of the MQ silicone resin of component b, 30.9 parts by weight of toluene, 0.703 parts by weight of the methylhydrogenpolysiloxane of component c, and 0.491 parts by weight of the curing retarder 20% solution of component e1 were sufficiently mixed at room temperature, and then 0.355 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a2 was 12.7, while the amount of the platinum metal to the solid fraction was 22 ppm.

The composition was cured via the abovementioned method, after which the adhesive force, viscoelasticity, and stress strain on the PMMA plate were measured via the abovementioned method, the evaluation results, and the like, of which were indicated in Table 2.

Example 5

36.4 parts by weight of the vinyl functional polydimethylsiloxane of component a2, 99.4 parts by weight of the MQ silicone resin of component b, 86.4 parts by weight of toluene, 1.29 parts by weight of the methylhydrogenpolysiloxane of component c, and 0.491 parts by weight of the curing retarder 20% solution of component e1 were sufficiently mixed at room temperature, and then 0.355 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a2 was 23.3, while the amount of the platinum metal to the solid fraction was 22 ppm.

The composition was cured via the abovementioned method, after which the adhesive force, viscoelasticity, and stress strain on the PMMA plate were measured via the abovementioned method, the evaluation results, and the like, of which were indicated in Table 2.

Comparative Example 1

43.1 parts by weight of the vinyl functional polydimethylsiloxane of component a2, 88.9 parts by weight of the MQ silicone resin of component b, 90.2 parts by weight of toluene, 0.356 parts by weight of the methylhydrogenpolysiloxane of component c, and 0.491 parts by weight of the curing retarder 20% solution of component e1 were sufficiently mixed at room temperature, and then 0.355 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a2 was 5.40, while the amount of the platinum metal to the solid fraction was 22 ppm.

The composition was cured via the abovementioned method, after which the adhesive force, viscoelasticity, and stress strain on the PMMA plate were measured via the abovementioned method, the evaluation results, and the like, of which were indicated in Table 2.

Comparative Example 2

43.1 parts by weight of the vinyl functional polydimethylsiloxane of component a3, 89.5 parts by weight of the MQ silicone resin of component b, 89.9 parts by weight of toluene, 0.353 parts by weight of the methylhydrogenpolysiloxane of component c, and 0.840 parts by weight of the curing retarder 20% solution of component e2 were sufficiently mixed at room temperature, and then 0.806 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a3 was 1.55, while the amount of the platinum metal to the solid fraction was 50 ppm.

The composition was cured via the abovementioned method, after which the adhesive force, viscoelasticity, and stress strain on the PMMA plate were measured via the abovementioned method, the evaluation results, and the like, of which were indicated in Table 2.

Comparative Example 3

36.2 parts by weight of the vinyl functional polydimethylsiloxane of component a1, 99.6 parts by weight of the MQ silicone resin of component b, 30.8 parts by weight of toluene, 0.332 parts by weight of the methylhydrogenpolysiloxane of component c, and 0.71 parts by weight of the curing retarder 20% solution of component e1 were sufficiently mixed at room temperature, and then 0.645 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a1 was 23.0, while the amount of the platinum metal to the solid fraction was 40 ppm.

The composition was cured via the abovementioned method, after which the adhesive force, viscoelasticity, and stress strain on the PMMA plate were measured via the abovementioned method, the evaluation results, and the like, of which were indicated in Table 2.

Comparative Example 4

43.1 parts by weight of the vinyl functional polydimethylsiloxane of component a1, 88.9 parts by weight of the MQ silicone resin of component b, 34.7 parts by weight of toluene, 0.434 parts by weight of the methylhydrogenpolysiloxane of component c, and 0.75 parts by weight of the curing retarder 20% solution of component e1 were sufficiently mixed at room temperature, and then 0.645 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a1 was 25.3, while the amount of the platinum metal to the solid fraction was 40 ppm.

The composition was cured via the abovementioned method, after which the adhesive force, viscoelasticity, and stress strain on the PMMA plate were measured via the abovementioned method, the evaluation results, and the like, of which were indicated in Table 2.

Comparative Example 5

50.0 parts by weight of the vinyl functional polydimethylsiloxane of component a1, 78.1 parts by weight of the MQ silicone resin of component b, 38.5 parts by weight of toluene, 0.350 parts by weight of the methylhydrogenpolysiloxane of component c, and 0.75 parts by weight of the curing retarder 20% solution of component e1 were sufficiently mixed at room temperature, and then 0.645 parts by weight of the platinum-based hydrosilylation reaction catalyst of component d was added to the mixture to obtain a curing reactive organopolysiloxane composition. The molar ratio (SiH/Vi ratio) of SiH groups in component c to the amount of alkenyl groups in component a1 was 17.6, while the amount of the platinum metal to the solid fraction was 40 ppm.

The composition was cured via the abovementioned method, after which the adhesive force, viscoelasticity, and stress strain on the PMMA plate were measured via the abovementioned method, the evaluation results, and the like, of which were indicated in Table 2.

TABLE 2

|  | b/a mass ratio | Vi mass % of component a | SiH/Vi | Storage elastic modulus G' (MPa) at 25° C. | Stress at 500% strain (MPa) | Pressure-sensitive adhesive strength (gf/inch) |
| --- | --- | --- | --- | --- | --- | --- |
| Example 1 | 1.75 | 0.065 | 5.40 | 2.62 | 1.45 | 1600 |
| Example 2 | 1.90 | 0.065 | 5.40 | 4.42 | 1.68 | 1780 |
| Example 3 | 1.76 | 0.222 | 1.55 | 4.83 | 1.69 | 1650 |
| Example 4 | 1.75 | 0.065 | 12.7 | 2.62 | 1.18 | 1690 |
| Example 5 | 1.75 | 0.065 | 23.3 | 2.01 | 1.45 | 1580 |
| Comparative Example 1 | 1.32 | 0.065 | 5.40 | 0.26 | 1.19 | 1120 |
| Comparative Example 2 | 1.32 | 0.222 | 1.55 | 0.78 | 2.05 | 1050 |
| Comparative Example 3 | 1.76 | 0.017 | 23.0 | 1.73 | 0.192 | 2100 |
| Comparative Example 4 | 1.32 | 0.017 | 25.3 | 0.167 | 0.177 | 1370 |
| Comparative Example 5 | 1.00 | 0.017 | 17.6 | 0.082 | 0.192 | 850 |

As shown in Table 2, the organopolysiloxane compositions for forming a pressure-sensitive adhesive layer of Examples 1 to 5 have a mass ratio of the chain organopolysiloxane to the organopolysiloxane resin in the predetermined range of the present invention, use an organopolysiloxane resin with a high molecular weight, and adopt combination in which the amount of vinyl is a certain level or higher. Sufficient curability was provided, the storage elastic modulus G' at 25° C. was 1.0 MPa or more, the tensile stress at 500% strain was 0.50 MPa or more, and the pressure-sensitive adhesive force was 1300 gf/inch or more. From the results, the organopolysiloxane compositions for forming a pressure-sensitive adhesive layer of the Examples have a relatively high storage elastic modulus and tensile stress, and also have a practically sufficient adhesive strength.

On the other hand, in Comparative Example 1 and Comparative Example 2, in which the mass ratio of the chain organopolysiloxane to the organopolysiloxane resin was not within the predetermined range of the present invention, the storage elastic modulus G' at 25° C. was 1.0 MPa or less, and the pressure-sensitive adhesive force was 1300 gf/inch or less. Thus, required characteristics of the present invention could not be achieved.

Furthermore, Comparative Examples 3 to 5, in which chain organopolysiloxanes having a low amount of vinyl is used, the tensile stress at 500% strain was less than 0.50 MPa even when the mass ratio of the chain organopolysiloxane to the organopolysiloxane resin was adjusted. Thus, required characteristics of the present invention could not be achieved. From the above, it was confirmed that the amount of vinyl in the chain organopolysiloxane being a certain level or higher, the mass ratio of the chain organopolysiloxane to the organopolysiloxane resin being a certain level or higher, and the selective use of a high molecular weight organopolysiloxane resin and a chain organopolysiloxane with a high amount of vinyl are necessary elements for obtaining a pressure-sensitive adhesive layer having a relatively high storage elastic modulus and tensile stress and a practically sufficient adhesive strength.

The invention claimed is:

1. An organopolysiloxane composition for forming a pressure-sensitive adhesive layer, the composition comprising:
   (A) a chain organopolysiloxane having on average more than one alkenyl group in a molecule;
   (B) an organopolysiloxane resin, wherein the total content of hydroxyl groups and hydrolyzable groups relative to all silicon atoms in a molecule is 9 mol % or less, and a weight average molecular weight (Mw) measured in terms of standard polystyrene by gel permeation chromatography (GPC) is 4500 or more;
   (C) an organohydrogenpolysiloxane having at least two Si—H bonds in a molecule; and
   (D) an effective amount of a hydrosilylation reaction catalyst; and
   optionally, (A') a chain organopolysiloxane not containing a reactive group having a carbon-carbon double bond in a molecule;
   wherein a content of vinyl ($CH_2$=CH) portions of the alkenyl groups in component (A) is within a range of 0.04 to 0.300 mass %, and a mass ratio of component (B) to the sum of components (A) and (A') is within a range of 1.75 to 1.90; and
   wherein a pressure-sensitive adhesive layer obtained by curing the composition has a shear storage elastic modulus G' at 25° C. of 1.5 to 7.5 MPa and a stress at 500% strain at 25° C. of 1.0 to 3.0 MPa.

2. The organopolysiloxane composition for forming a pressure-sensitive adhesive layer according to claim 1, wherein a pressure-sensitive adhesive force of a pressure-sensitive adhesive layer having a thickness of 50 μm obtained by curing the composition, as measured at a tension rate of 300 mm/min using a 180° peeling test method in accordance to JIS Z 0237 for a polymethyl methacrylate sheet having a thickness of 2 mm, is within a range of 1300 gf/inch or more.

3. The organopolysiloxane composition for forming a pressure-sensitive adhesive layer according to claim 1, wherein a pressure-sensitive adhesive force of a pressure-sensitive adhesive layer having a thickness of 50 μm obtained by curing the composition, as measured at a tension rate of 300 mm/min using a 180° peeling test method in accordance to JIS Z 0237 for a polymethyl methacrylate sheet having a thickness of 2 mm, is within a range of 1400 gf/inch or more.

4. The organopolysiloxane composition for forming a pressure-sensitive adhesive layer according to claim 1, wherein:
   component (A) is a chain organopolysiloxane in which the content of vinyl ($CH_2$=CH) portions of the alkenyl groups is within a range of 0.04 to 0.27 mass % and at least a portion of component (A) is (A1) a raw rubber organopolysiloxane containing an alkenyl group and having a viscosity of 100,000 mPa's or more at 25° C. or having a plasticity within a range of 50 to 200 as measured in accordance with a method as specified in JIS K6249;
   component (B) is an organopolysiloxane resin mixture containing a $R_3SiO_{1/2}$ unit (M unit) and an $SiO_{4/2}$ unit (Q unit), where R is a monovalent organic group and 90 mol % or more of R is an alkyl group having 1 to 6 carbon atoms or a phenyl group;
   an amount of component (C) is in an amount such that the ratio (molar ratio) of the amount of SiH groups in component (C) relative to the total amount of the alkenyl groups in components (A) and (B) is 0.1 to 100; and
   an amount of component (D) is in an amount such that a platinum-based metal in a solid fraction of the composition is within a range of 0.1 to 200 ppm.

5. The organopolysiloxane composition for forming a pressure-sensitive adhesive layer according to claim 1, wherein component (A) is a chain organopolysiloxane having on average more than one alkenyl group in a molecule, wherein the alkenyl is bonded to a silicon atom at a site other than an end of a molecular chain.

6. The organopolysiloxane composition for forming a pressure-sensitive adhesive layer according to claim 1, wherein an amount of component (C) is in an amount such that the ratio (molar ratio) of the substance amount of SiH groups in component (C) relative to the total substance amount of the alkenyl groups in components (A) and (B) is 20 to 60.

7. A pressure-sensitive adhesive layer obtained by curing the organopolysiloxane composition for forming a pressure-sensitive adhesive layer according to claim 1.

8. A laminated body, comprising a pressure-sensitive adhesive layer obtained by curing the organopolysiloxane composition for forming a pressure-sensitive adhesive layer according to claim 1 on a film substrate.

9. The laminated body according to claim 8, wherein a release layer for the pressure-sensitive adhesive layer is provided on one or two or more film substrates.

10. An elastic pressure-sensitive adhesive member obtained by curing the organopolysiloxane composition for forming a pressure-sensitive adhesive layer according to claim 1.

11. An electronic apparatus or electrical device, comprising the elastic pressure-sensitive adhesive member according to claim 10.

12. A speaker, comprising the elastic pressure-sensitive adhesive member according to claim 10.

13. The organopolysiloxane composition for forming a pressure-sensitive adhesive layer according to claim 1, wherein octamethyltetrasiloxane and decamethylpentasiloxane are each present in the composition in an amount of less than 0.1 mass % of component (A).

14. The organopolysiloxane composition for forming a pressure-sensitive adhesive layer according to claim 1, wherein component (B) has a molar ratio of M units to Q units of from 0.5 to 2.0.

* * * * *